May 4, 1926.

G. K. DAVOL 1,583,671

INTERNAL COMBUSTION ENGINE

Filed August 26, 1921  3 Sheets-Sheet 3

Patented May 4, 1926.

1,583,671

UNITED STATES PATENT OFFICE.

GEORGE K. DAVOL, OF SAN FRANCISCO, CALIFORNIA, ASSIGNOR TO CHARLES A. BROWN, OF HINSDALE, ILLINOIS.

INTERNAL-COMBUSTION ENGINE.

Application filed August 26, 1921. Serial No. 495,476.

*To all whom it may concern:*

Be it known that I, GEORGE K. DAVOL, a citizen of the United States, residing at San Francisco, in the county of San Francisco and State of California, have invented a certain new and useful Improvement in Internal-Combustion Engines, of which the following is a full, clear, concise, and exact description, reference being had to the accompanying drawings, forming a part of this specification.

My invention relates to internal combustion engines, and more specifically to a device for regulating the supply of fuel and air to an internal combustion engine, or for regulating the ratio between the weight of the air supplied and the weight of the fuel supplied to such an engine. The invention has particular application to engines in the operation of which the supply of air is restricted at partial loads, by throttling or otherwise.

In such engines it is desirable to provide for a certain definite variable ratio of weight of air to weight of fuel in the mixture or charge compressed within the cylinder, to suit various loads and conditions of operation. Thus, for light or partial loads, when the supply of air is restricted or throttled, the supply of fuel must also be restricted or cut down, but not ordinarily to the same extent. It is usually found advantageous in the operation of such engines at partial load, when the air supply is throttled or restricted, to supply a richer mixture, or a reduced ratio of air to fuel, than when operating at full load with an unrestricted supply of air. The most advantageous ratio of air to fuel cannot be fixed, even for any given restriction of air supply, or given density of air drawn into the cylinder, but for most desirable results this ratio should be varied to also suit the character of fuel used, the relative temporary importance of maximum power output and maximum economy of fuel, and to suit starting conditions and other considerations.

In the form of apparatus I have here shown as embodying my invention, the supply of air to the engine is regulated by any of the customary devices such as the usual hand operated throttle.

A connection is made between the intake pipe or manifold of the engine and the apparatus, whereby the pressure within the intake is arranged to operate on a piston forming part of the device. The movement of this piston in one direction is counteracted by a spring, so that for any given vacuum in the intake of the engine the piston will take a certain corresponding position, in which position the pull of the vacuum within the intake is approximately balanced by the pressure exerted on the piston by the spring. The movement of the piston is used to control a device for supplying fuel to the engine.

In communicating this movement of the piston to the fuel applying means of my invention, it is essential that the following conditions be fulfilled:

(a) For every degree of density of air within the intake of the engine a certain definite quantity of fuel must be supplied per engine cycle, for any setting or adjustment of the apparatus, according to some determined law or rule of variation, which in the present state of the art may be most easily determined empirically and expressed graphically by a curve.

(b) This determinate rule according to which the proportion of fuel to air is governed, (either varied or maintained constant), with varying degrees of density of the air drawn into the engine cylinder, must also be capable of variation, to suit variations in character of fuel, and starting and other conditions.

The essence of my invention lies in that variation of engine intake pressures is translated into movements, which act on the fuel supplying means of the apparatus, in a manner to fulfill the above mentioned requirements. With the fuel supplying means of such complete apparatus my invention is less essentially concerned, and it is only required that any form of workable device or pump be supplied capable of having its quantity of delivery varied, in some preferably positive manner, as for example through the variation of the stroke of the plunger of a pump.

Figure 3:
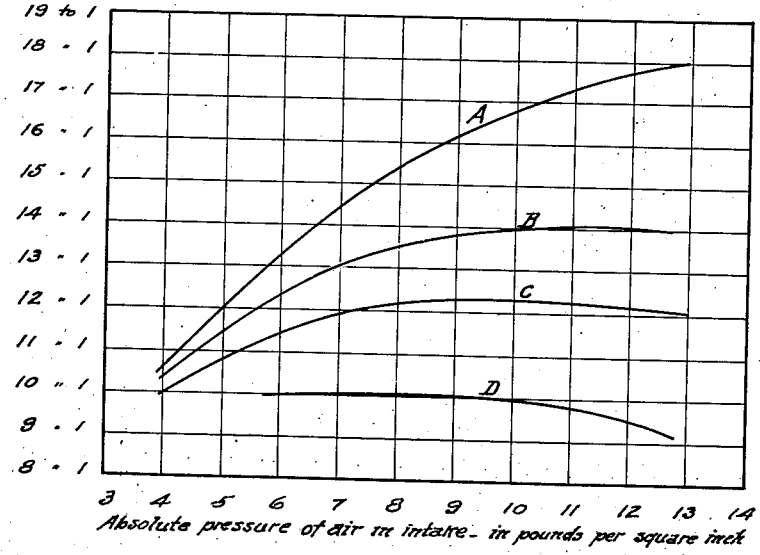
Figure 3 is a diagram giving curves of ratios of air to fuel for various degrees of density of air taken into the cylinder of an engine, which curves can be followed in the operation of the apparatus.

Referring to the accompanying drawings, and first to Figure 3, I here show a diagram giving four curves, each curve representing a certain rule of variation of the ratio of air to fuel with varying degrees of intake pressure. In this diagram the ratios of air to fuel are shown to increase with the vertical height above the base while the intake pressures are set off horizontally. The curve marked A shows the manner in which the ratio of air to fuel may be desired to vary with various air densities within the engine intake, for economical operation with certain fuels. The curve marked B gives a larger proportion of fuel to the charge for all air densities. The curve C gives a still greater proportion of fuel to air or a richer mixture for all air densities and may be adapted for conditions at starting the engine or for a maximum output of power with certain fuel, and curve D gives still further enrichment of fuel to the mixture. These four curves, which may be taken as typical examples of conditions of mixture which may be desirable under certain conditions of operation, can all be followed, as well as other curves which may be plotted between the curves drawn, by the form of apparatus I have herein described.

Figure 1:
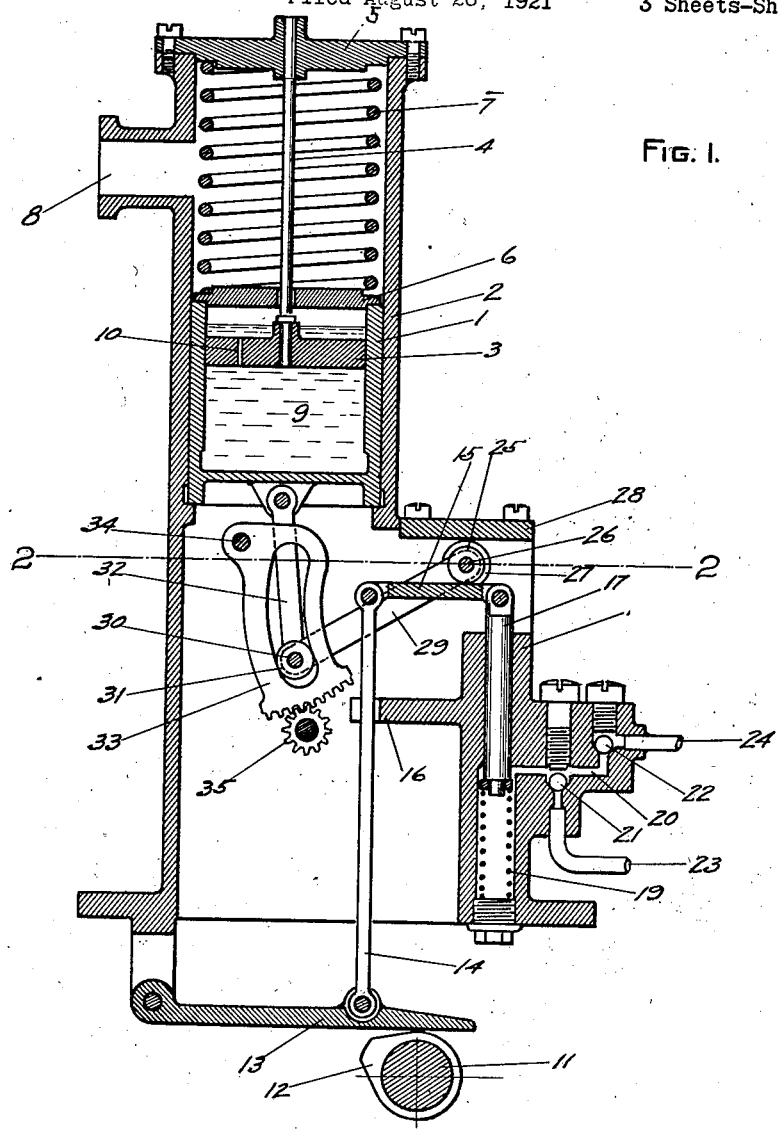
Figure 1 is a sectional view taken through the center of one form of the device.

Referring to Figure 1, the piston 1, operating in the cylinder 2 formed in the body of the apparatus, is bored out and in turn forms a cylinder in which is fitted an oil piston or dash pot piston 3. This dash pot piston 3 is held stationary by a rod 4 which is secured to the cover 5 fastened to the body. An oil retaining cover 6 is suitably secured to the open top of the piston 1 and acts to prevent splashing of the oil. It also forms a seat for the spring 7, the other end of which bears against the cover 5. The space shown above the piston 1 containing the spring is an air tight space entirely closed except for the pipe connection or passage 8 through which connection is made to the intake pipe or manifold of the engine.

It will be seen that any degree of suction in the engine intake will cause a fall of pressure above the piston 1 and the lower face of the piston being open to the atmosphere, the piston will tend to rise against the downward pressure of the spring 7. The piston 1, forming in itself a dash pot or cylinder, is supplied with a suitable quantity of oil 9. The dash pot piston 3 has a hole 10 formed in it, and being held stationary, any movement of the piston 1 will cause the oil to flow through this hole 10 and the movement of the piston 1 will be damped or checked by forcing the oil back and forth through this hole, to prevent too rapid movement of the piston 1.

The shaft 11 may be the cam shaft of the engine or any shaft suitably geared to the engine to make one revolution for each complete engine cycle. The cam 12 is formed on the shaft and the revolutions of this cam cause the finger 13 to oscillate. This finger is connected by the rod 14 to one end of the lever 15 which lever is guided and held in line by the slotted guide 16.

The opposite end of the lever 15 is pinned to the upper end of the fuel pump plunger 17 which reciprocates in the cylinder 18. Against the lower end of the plunger the spring 19 bears and tends to force the plunger up. The closed chamber beneath the plunger connects by the passage 20 with the intake valve 21 and the delivery valve 22 which are here indicated as ordinary ball valves. The suction pipe 23 and the delivery pipe 24 afford connection with their respective valves.

Figure 2:
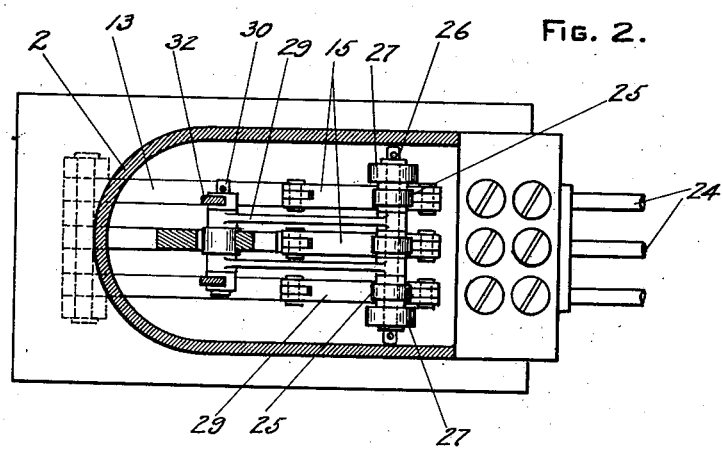
Figure 2 is a section on line 2—2 of Figure 1.

In Figure 2 the ends of three plungers are shown, the apparatus in the form illustrated being intended for a three cylinder engine, and having a separate pump cylinder for each engine cylinder. Each pump plunger having the connecting and operating parts just described.

Above the lever 15 are the fulcrum rollers 25 which are mounted on the shaft 26. This shaft is held down by the bearing rollers 27, one at each end of the shaft, which rollers bear against the holding down plate 28 secured to the body of the apparatus.

It will be seen that revolutions of the cam 12 acting through the finger 13, rod 14 and lever 15 will cause reciprocating movements of the plunger 17, the lever 15 bearing against the fulcrum roller 25. The spring 19 acting on the plunger will also through these connections keep finger 13 in contact with cam 12. The extent of the movements of the pump plunger 17 will be regulated by the position of the fulcrum roller 25, and if this fulcrum roller be moved to a position directly over the plunger 17, the plunger will have no movement at all imparted to it. It is thus possible to communicate to the pump plunger all degrees of movement from nothing up to a certain practical maximum by varying the position of the fulcrum roller 25.

These fulcrum rollers 25 are carried by the shaft 26, and this shaft in turn is held in place by the two arms 29, the other ends of which engage with a pin 30, which passes through a guide roller 31. This pin 30 is also held by two arms 32, which arms connect in turn with the piston 9. The position of the piston 9 therefore governs the vertical position of the guide roller 31.

The guide roller 31 moves in a specially formed slot formed in the part 33. This part 33 is pivoted on the pin 34 at its upper end, and its angular position about this pin as center is adjustable through the pinion 35 acting on the toothed segment at its lower end. This part 33 as a whole I term an "adjustable profile" as this term is most comprehensively descriptive of it in any of the many forms in which it can be made. The function of the adjustable profile 33 is to properly translate or transform the movements of the piston 9 (which are directly proportional to variations in the density of the air drawn into the engine cylinders), to movements which properly vary the delivery of fuel by the pump plunger or other fuel supplying device.

In making this translation or modification of movement, compensation must be properly made for; first, the manner in which the pump delivery is varied, in this case by the shifting of a fulcrum, and second, for the desired variation (if any) in the ratio of air to fuel.

This translation of movement therefore, involving as it does the following of a curve of a varying ratio of air to fuel, as well as sometimes (as in the form of apparatus illustrated), having to compensate for a varying degree of movement necessary for any given progressive variation in pump delivery, becomes an involved matter. These requirements are rendered still more difficult through the necessity of providing for a possible variation of the curve of ratios of air to fuel which must be followed.

To accurately and properly fill these requirements an apparatus capable of extreme freedom in its compensating capacity is demanded, and I have been able to discover or devise no form of mechanical device that has this unusual flexibility for compensation to the extent that is supplied by an adjustable profile or guide or a formed profile of adjustable position. Along such a profile or guide a roller or follower may be moved proportional to variations in the density of the air supplied to the engine cylinders, and movements resulting from the form of the profile be utilized to correspondingly vary the amount of fuel supplied. Such is exactly the action of the apparatus herein described.

The movements of the piston 9 proportional to the variations in the density of the air supplied to the engine cylinders are communicated to the roller 31. This roller moves along the "adjustable profile" formed by the curved slot in the part 33 and the resulting movements of the roller laterally are communicated through the links 29 to the fulcrum rollers 25 and so the delivery of the pump is correspondingly varied according to the set requirements.

The apparatus as shown in Figure 1 with the adjustable profile 33 in the position there shown may be reasonably assumed to be adjusted to give ratios of air to fuel such as are indicated by the curve A in Figure 3.

If we now readjust the position of the adjustable profile 33 by turning the pinion 35 slightly, so that the lower end of the adjustable profile 33 is moved a small distance to the left, the pump will deliver more fuel for any degree of air density, and the resulting ratios of air to fuel will be those indicated by the curve B in Figure 3. In the same way by readjusting the position of the profile 33 still more to the left the curves C and D can be followed in the resulting ratios of air to fuel, or any one of an indefinite number of curves of general similarity can be followed by proper adjustment of the position of the adjustable profile 33.

By modifying the form or curvature of the slot in the part 33 which forms the profile, curves of air-fuel ratios of different form and characteristics will be followed by the apparatus, and by modifying the position of the pin 34 on which the adjustable profile is pivoted, a change will be introduced in the relative characteristics of the curves followed with different settings or adjustments of the profile.

Figure 4:
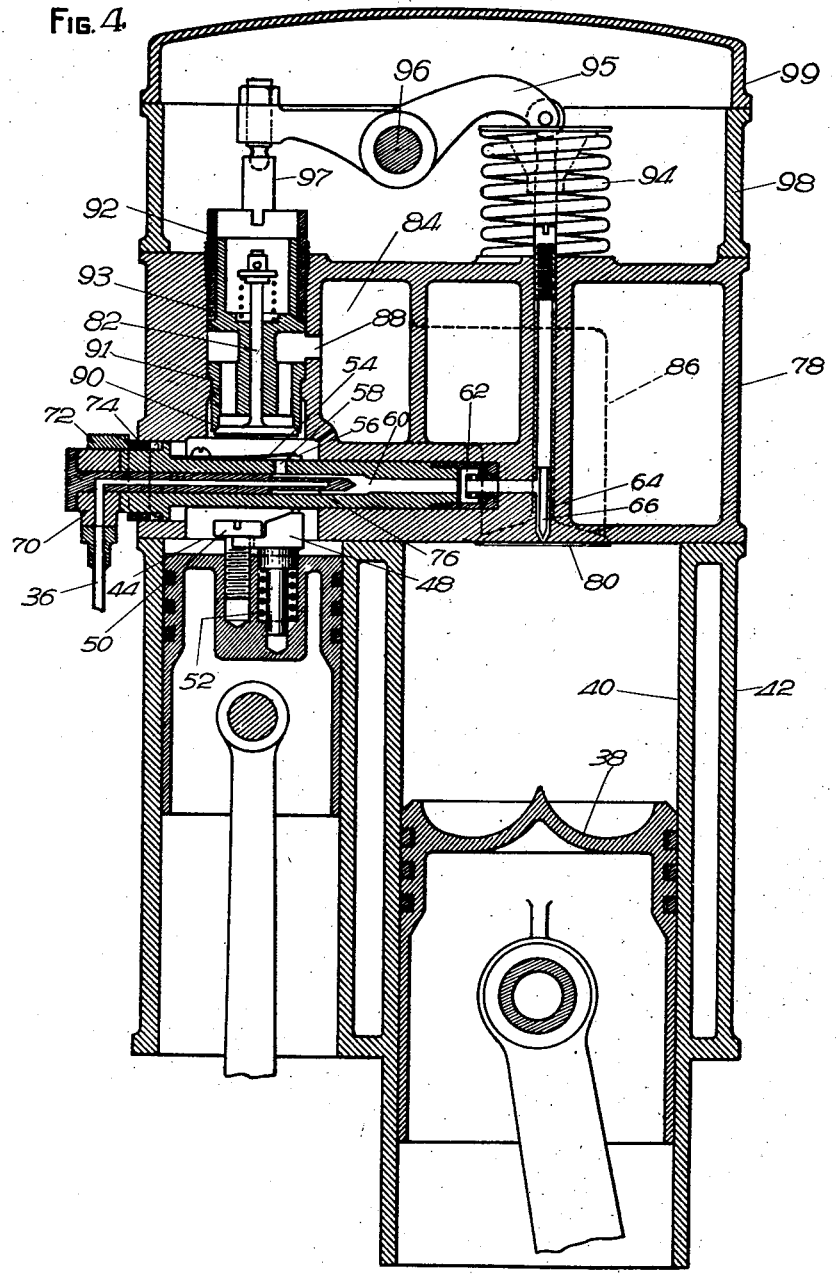
Figure 4 illustrates a type of engine in connection with which my invention may be used to special advantage.

The fuel may be delivered, for instance, to the supply tube 36 of the engine illustrated in Figure 4. In this engine the main piston 38 reciprocating in cylinder 40 in casting 42, is provided with an individual charge compressing piston 44 sliding in cylinder 46. The charge compressed by piston 44 is liberated toward the end of the compression stroke by contact block 48 held in place by set screw 50 and pressed upward by spring 52. This block lifts valve 54 by moving plunger 56, and permits the compressed charge to pass through port 58, passage 60, a check valve designated as an entirety by the reference 62, and passage 64, to be discharged into cylinder 40 under the control of needle valve 66.

Supply tube 36 communicates with nozzle 68 through head 70 held in place by clamp 72 and packing retainer 74, so that the charge of fuel will be deposited through orifice 76 to be picked up and carried into the cylinder 40.

The cylinder head casting 78 houses inlet valve 80 and a check valve 82 opening into cylinder 44, both valves controlling the flow from a common intake passage 84, by passages indicated at 86 and 88, respectively. The pressure of the air supply to both valves may thus be controlled by a single throttle. Check valve 82 rests on a seat 90 held against shoulder 91 by a retaining nut 92 provided with packing 93. Inlet valve 80 is normally held closed by a spring 94 and opened by rocket 95 pivoted on shaft 96 and actuated by tappet rod 97. A frame 98 supports shaft 96, and a cover 99 protects the parts from dirt.

Having now described the construction and action of the apparatus illustrated in the drawings, I wish to call attention to the fact that many modifications of construction and arrangement may be introduced without affecting the action of the apparatus or the essentials of the invention. The adjustable profile 33 is not necessarily pivoted and adjusted angularly, but other provision may be made for holding it and adjusting its position. It will also be realized that the adjustable profile may be the part that is moved by the piston which is acted on by the intake pressure, and the roller or pivot which bears against it may be held relatively stationary in line with the movement of the profile. In such an arrangement special means must be provided for holding the profile in its various adjustable positions while permitting the movements imparted to it by the piston.

Another obvious modification would be to pivot the adjustable profile and allow an oscillating movement to be imparted to it by the piston about its pivot and provide for adjusting the position of the pivot. Such modifications are obvious and introduce no change in the essentials of the invention.

I claim:

1. In combination, an element responsive to pressures, a fuel supplying device, means for controlling the delivery of the said fuel supplying device, means for establishing a connection between the said element and the controlling means and means for varying the said connection in accordance with a predetermined ratio.

2. In combination, a fuel supplying device, means for actuating said fuel supplying device, an element responsive to pressure, means controlled by the said element for establishing a connection between the said element and the said fuel supplying device, and means for varying the said connection in accordance with a predetermined ratio.

3. In combination, an element responsive to pressures, a fuel supplying device, means for controlling the delivery of the said fuel supplying device, a fulcrum, a second means associated with the fulcrum for varying the delivery of the fuel supplying device and means for establishing a connection between the fulcrum and the element, to control the said second means.

4. In combination a piston responsive to pressures, a fuel supplying device, a member associated with the said piston provided with a slot and means connected to the fuel supplying device and governed by the slot in the member for controlling the delivery of the fuel supplying device.

5. In a fuel regulator for internal combustion engines, a spring loaded piston acted on by the pressures within the intake of the engine, a fuel pump, means for varying the delivery of the fuel pump, a profile of adjustable position, a follower in contact with said profile, connection with said piston causing relative movement between said profile and said follower, and a connection for transmitting components of said relative movement to said means for varying the delivery of said pump.

6. In a fuel regulator for internal combustion engines, a spring loaded piston acted on by the pressures within the intake of the engine, a fuel pump, means for varying the delivery of said fuel pump, an adjustable profile, a follower in contact with said profile, connections translating the movements of said piston into relative movements between said follower and said profile, and connections transmitting components of said relative movements to said means for varying the delivery of said pump.

7. In a fuel regulator for internal combustion engines, a piston acted on by the pressure within the intake of the engine, a fuel pump, means for varying the delivery of the fuel pump, a profile, a follower in contact with said profile, connections transforming movements of said piston into relative movements between said profile and said follower, and connections transmitting movements resultant upon said relative movement between said profile and said follower to said means for varying the delivery of said pump.

8. In a fuel regulator for internal combustion engines, a spring loaded piston acted on by the pressure within the engine intake, a fuel pump, means for varying the delivery of the fuel pump, a profile pivoted about a fixed point and adjustable angularly about said point, a follower in contact with said profile and connected with said piston, and connections between said follower and the means for varying the delivery of said pump.

9. In a fuel regulator for internal combustion engines, a spring loaded piston acted on by the pressure within the engine intake, a fuel pump, means for varying the delivery of said pump, a profile of adjustable position, said profile having a curved slot, a follower movable in said slot, connections between said profile and said piston, and connections between said follower and said means for varying the delivery of said pump.

10. In a fuel regulator for internal combustion engines, an intake connection, a fuel supplying device, controlling means for governing the delivery of the said fuel supplying means, a piston responsive to the pressure in the said intake connection, a first element adapted to reciprocate with the said piston, a pivoted element provided with a slot, a roller riding in the said slot and adapted to be reciprocated by the said first element and means for establishing a connection between the roller and the controlling means.

In witness whereof, I hereunto subscribe my name this 23rd day of August, 1921.

GEORGE K. DAVOL.